United States Patent

Ichikawa et al.

[11] Patent Number: 5,871,367
[45] Date of Patent: Feb. 16, 1999

[54] RELATIVE ROTARY MEMBERS RELAYING APPARATUS

[75] Inventors: Hidehiro Ichikawa; Kazuhito Sakai; Katsu Yasui, all of Shizuoka-ken, Japan

[73] Assignee: Yazaki Corporation, Tokyo, Japan

[21] Appl. No.: 863,018

[22] Filed: May 23, 1997

[30] Foreign Application Priority Data

Jun. 28, 1996 [JP] Japan ................................. 8-170058

[51] Int. Cl.$^6$ .................................................. H01R 35/04
[52] U.S. Cl. .............................................. 439/164; 439/15
[58] Field of Search ........................................ 439/164, 15

[56] References Cited

U.S. PATENT DOCUMENTS

| | | | |
|---|---|---|---|
| 5,252,085 | 10/1993 | Kato et al. | 439/164 |
| 5,256,075 | 10/1993 | Miyahara et al. | 439/164 |
| 5,314,341 | 5/1994 | Kazita et al. | 439/164 |

FOREIGN PATENT DOCUMENTS

5-207632  8/1993  Japan .

*Primary Examiner*—Gary F. Paumen
*Attorney, Agent, or Firm*—Finnegan, Henderson, Farabow, Garrett & Dunner, L.L.P.

[57] ABSTRACT

A relative rotary members relaying apparatus of the invention comprises, a rotary body having an internal cylindrical portion, a fixed body which surrounds the internal cylindrical portion with a predetermined distance and has an external cylindrical portion rotating relative to the internal cylindrical portion, a flexible flat cable stored along an annular space provided between the internal cylindrical portion and the external cylindrical portion, a lower cover for covering one side of the space in axial direction, and an upper cover for covering the other side of the space in axial direction which are fixedly mounted to the fixed body. A first radial clearance between the first cover and the first rotating body being configured to be different from a second radial clearance between the second cover and the rotary body.

5 Claims, 5 Drawing Sheets

RELATIVE ROTARY MEMBERS RELAYING APPARATUS

BACKGROUND OF THE INVENTION

1. Field of the Invention

This invention relates to a relative rotary members relaying apparatus for achieving electrical connection between relatively rotating members through a cable.

2. Description of the Related Art

A relative rotary members relaying apparatus of the related art includes a rotary body having an internal cylindrical portion, a fixed body having an external cylindrical portion for surrounding the internal cylindrical portion with a predetermined distance and a C-shaped moving body provided in a space formed between the rotating body and the fixed body. A flexible flat cable is disposed in a space between the rotary body and an internal peripheral surface of the C-shaped moving body and further disposed in a space between the internal peripheral surface of the fixed body and the external peripheral surface of the C-shaped moving body through a gap portion in the C-shaped moving body. The fixed body has a top and lower covers for preventing the C-shaped moving body and the flexible flat cable from being slipped out of the fixed body.

However, when the rotary body is rotated relative to the fixed body, the external peripheral surface of the rotary body comes into rotatably contact with an internal peripheral surface of a through hole formed in the top cover of the fixed body and with a internal peripheral surface of a through hole formed in the lower cover of the fixed body thereby producing sliding noises from the rotatably contacting portions.

SUMMARY OF THE INVENTION

Accordingly, the present invention has been proposed to solve the above described problem. An object of the present invention is to provide a relative rotary members relaying apparatus capable of reducing sliding noise produced when an external peripheral surface of a rotary body rotates relative to an internal peripheral surface of a through hole in a top cover of a fixed body and to an internal peripheral surface of a through hole in a lower cover thereof.

According to a first aspect of the present invention, there is provided a relative rotary members relaying apparatus comprising: a rotary body having an internal cylindrical portion; a fixed body which surrounds the internal cylindrical portion with a predetermined distance and has an external cylindrical portion relatively rotating to the internal cylindrical portion; a flexible flat cable stored along an annular space provided between the internal cylindrical portion and the external cylindrical portion, an internal peripheral end portion thereof being held by the internal cylindrical portion and an external peripheral end portion thereof being held by the external cylindrical portion; a lower cover for covering one side of the space in axial direction; and a top cover for covering the other side of the space in axial direction, wherein the lower cover and the top cover are fixedly mounted to the fixed body, and a first radial clearance between the lower cover and the first rotating body is configured to be different from a second radial clearance between the top cover and the rotary body.

In the above described construction, because the lower cover and the top cover are fixedly mounted to the fixed body, the lower cover and the top cover are rotated relative to the rotary body. That is, the lower cover slides on the rotary body with the first radial clearance and the top cover slides on the rotary body with the second radial clearance.

In this connection, since the first radial clearance is configured to be different from the second radial clearance, for example by configuring the first radial clearance to be smaller than the second radial clearance, contact between the top cover and the rotary body with the second radial clearance is eliminated. Thus, sliding noise can be reduced correspondingly.

According to a second aspect of the present invention, as it depend from the first aspect, the relative rotary members relaying apparatus further comprises: an internal annular convex portion formed on the rotary body; and an external annular convex portion formed on the fixed rotary body, wherein a third radial clearance between the internal annular convex portion and the external annular convex portion which is configured to be larger than the first radial clearance and smaller than the second radial clearance.

According to a third aspect of the present invention, as it depend from the first aspect, the relative rotary members relaying apparatus further comprises: an internal annular convex portion formed on the rotary body, an external annular convex portion formed on the fixed rotary body, wherein a third radial clearance between the internal annular convex portion and the external annular convex portion which is configured to be larger than the first radial clearance and equal to the second radial clearance.

According to a forth aspect of the present invention, there is provided a relative rotary members relaying apparatus comprising: a rotary body having an internal cylindrical portion; a fixed body which surrounds the internal cylindrical portion with a predetermined distance and has an external cylindrical portion relatively rotating to the internal cylindrical portion; a flexible flat cable stored along an annular space provided between the internal cylindrical portion and the external cylindrical portion, an internal peripheral end portion thereof being held by the internal cylindrical portion and an external peripheral end portion thereof being held by the external cylindrical portion; a lower cover for covering one side of the space in axial direction; and a top cover for covering the other side of the space in axial direction, wherein the lower cover and the top cover are fixedly mounted to the rotary body, and a first radial clearance between the lower cover and the second rotating body is configured to be different from a second radial clearance between the top cover and the fixed body.

In the above described construction, because the lower cover and the top cover are fixedly mounted to the rotary body, the lower cover and the top cover are rotated relative to the fixed body. That is, the lower cover slides on the fixed body with the first radial clearance and the top cover slides on the fixed body with the second radial clearance.

In this case, because the first radial clearance is configured to be different from the second radial clearance, for example by configuring the first radial clearance to be smaller than the second radial clearance, contact between the top cover and the fixed body with the second radial clearance is eliminated. Thus, sliding noise can be reduced correspondingly.

According to a fifth aspect of the present invention, there is provided a relative rotary members relaying apparatus comprising: a rotary body having an internal cylindrical portion; a fixed body which surrounds the internal cylindrical portion with a predetermined distance and has an external cylindrical portion relatively rotating to the internal cylindrical portion; a flexible flat cable stored along an annular space provided between the internal cylindrical portion and the external cylindrical portion, an internal peripheral end portion thereof being held by the internal cylindrical portion and an external peripheral end portion thereof being held by the external cylindrical portion; a lower cover for covering one side of the space in axial direction; and a top cover for covering the other side of the space in axial direction, wherein any one of the lower cover and the top cover being fixedly mounted to the rotary body and the other cover is fixedly mounted to the fixed body, and a first radial clearance between the one cover and the second rotating body is configured to be different from a second radial clearance between the other cover and the rotary body.

In the construction described above, because any one of the lower cover and the top cover is fixedly mounted on the rotary body and the other cover is fixedly mounted on the fixed body, the one cover is rotated relative to the fixed body and the other cover is rotated relative to the rotary body. That is, there is a possibility that sliding noise may occur by one cover and the fixed body with the first radial clearance. Further, the other cover slides on the first rotating body with the second radial clearance.

In this case, because the first radial clearance is configured to be different from the second radial clearance, for example by configuring the first radial clearance to be smaller than the second radial clearance, contact between the other cover and the rotary body in the second radial clearance is eliminated. Thus the sliding noise can be reduced correspondingly.

The above and further objects and novel feature of the present invention will more fully appear from the accompanying drawings and the detailed descriptions of the preferred embodiments.

DETAILED DESCRIPTION OF THE PREFERRED EMBODIMENTS

Hereinafter, embodiments of the present invention will be described with reference to FIGS. 1 to 8.

Figure 1:
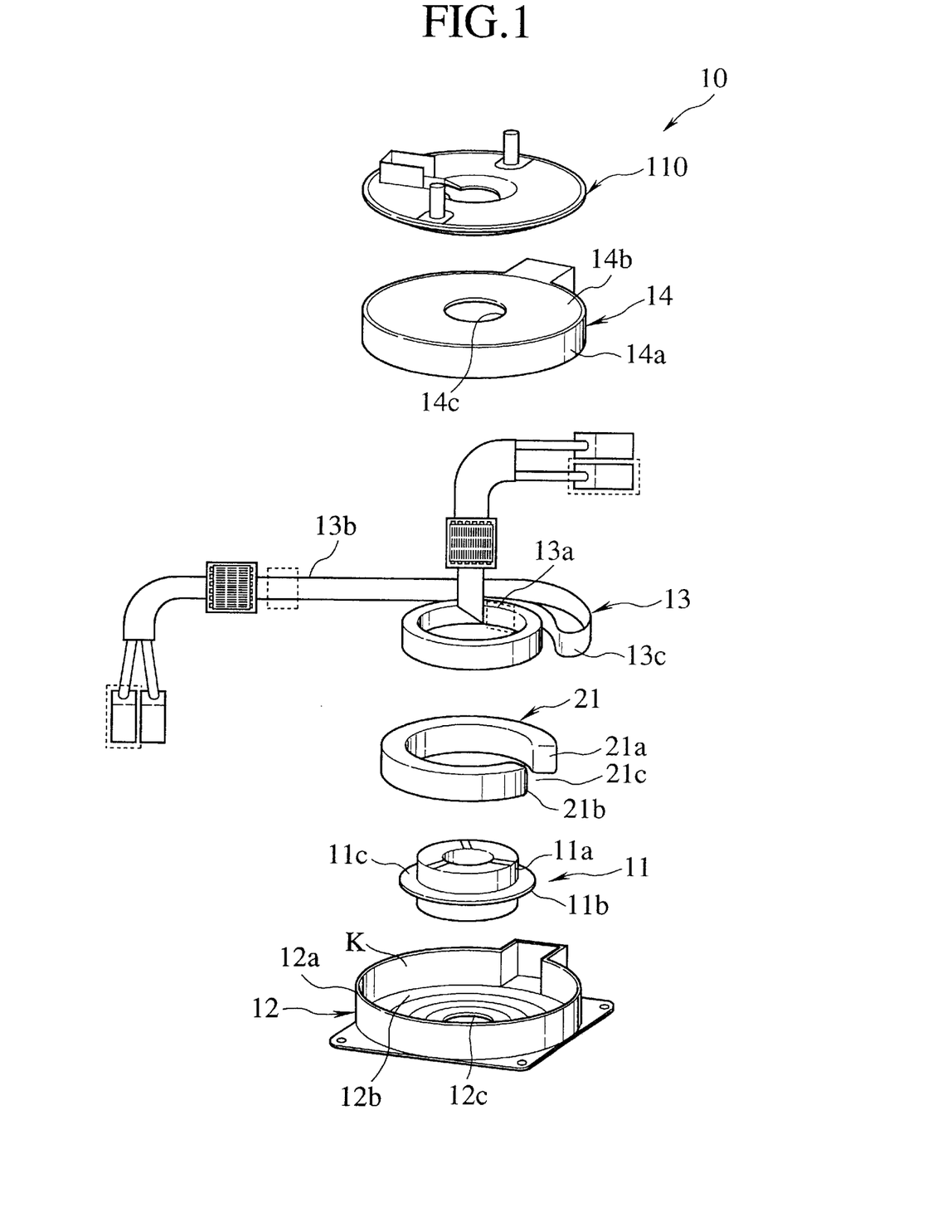
FIG. 1 is a exploded perspective view of a relative rotary members relaying apparatus of the present invention.

As shown in FIG. 1, a relative rotary members relaying apparatus 10 comprises a rotary body as first rotary body 11 having an internal cylindrical portion 11a, a fixed body as second rotary body 12 having an external cylindrical body 2a for surrounding the internal cylindrical portion 11a with a predetermined distance, a cable as flexible flat cable 13 which is stored in an annular space K between the internal cylindrical portion 11a and the external cylindrical portion 12a, its internal peripheral end portion 13a being held by the internal cylindrical portion 11a and its external peripheral end portion 13b being held by the external cylindrical portion 12a, and a C-shaped moving body 21 which is freely movable along the aforementioned space K and inverts the cable 13 at an opening portion 21c.

The rotary body 11 is provided with a flange 11b for the moving body 21 to be mounted freely movably. The moving body 21 inverts the cable 13 smoothly through an opening end 21a or the other opening end 21b of an opening portion 21c and freely moves along the peripheral direction of the space K on a top surface 11c of the flange 11b. Meanwhile, in some type, the cable 13 is disposed only in spiral form without providing the moving body 21.

Figure 2:
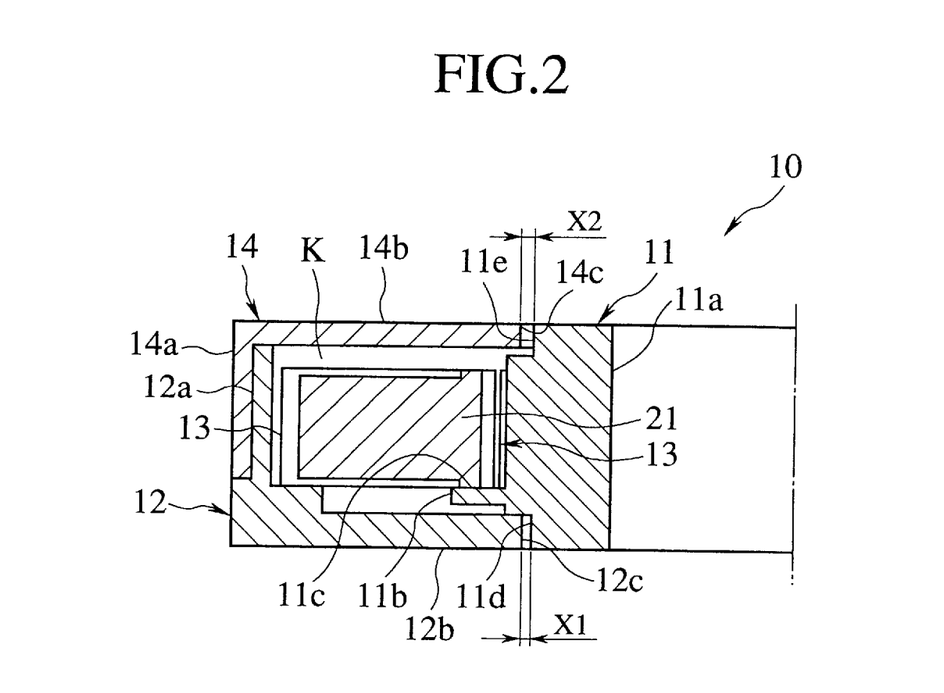
FIG. 2 is a partial sectional view of major parts of the relative rotary members relaying apparatus according to a first embodiment of the present invention.

The fixed body 12 has a lower cover as a first cover 12b formed integrally therewith for covering a bottom of the space K and supporting the rotary body 11 rotatably. As shown in FIG. 2, this lower cover 12b has a through hole 12c which is engaged with a bottom end as one end 11d of the internal cylindrical portion 11c of the rotary body 11.

As shown in FIG. 1, the fixed body 12 is covered with a cover member 14. That is, the cover member 14 comprises a cylindrical portion 14a for surrounding a circumference of the external cylindrical portion 12a and a top cover as a second cover 14b for covering a top of the space K, the cylindrical portion 14a and the top cover 14b being formed integrally with each other. This cover member 14 is fixedly mounted to the fixed body 12 through a connecting means (not shown). The cover 14b has a through hole 14c formed so as to engage with a top end portion as the other end portion 11e of the internal cylindrical portion 11a of the rotary body 11.

As shown in FIG. 1, an external introducing cover 110 for introducing the internal peripheral end portion 13a of the cable 13 is provided above the cover member 14. This external introducing cover 110 is connected to the rotary body 11 such that it rotate with the same rotary body 11.

The rotary body 11 is connected to, for example, a steering wheel section of a vehicle's steering wheel system and the fixed body 12 is fixed to the steering column.

In the relative rotary members relaying apparatus 10 having the above described structure, if the internal cylindrical portion 11a is rotated counterclockwise in FIG. 1, the cable 13 is moved so as to wind around the internal cylindrical portion 11a. Thus, the cable 13 outside of the moving body 21 is inverted while in contact with the opening end 21a of the moving body 21 and enters inside of the moving body 21 so as to wind around the internal cylindrical portion 11a. At this time, the opening end 21a of the moving body 21 is pushed by an inverted portion 13c of the cable 13 so that the moving body 21 is rotated counterclockwise together with the same inverted portion 13c.

When the internal cylindrical portion 11a is rotated clockwise relative to the external cylindrical portion 12a, the cable 13 wound around the internal cylindrical portion 11a is wound back and moved to the periphery. Thus, the cable 13 wound around the internal cylindrical portion 11a is inverted while in contact with the opening end 21b and moved to outside of the moving body 21 and further comes into a firm contact with an internal surface of the external cylindrical portion 12a. At this time, the other opening end 21b of the moving body 21 is pushed by the inverted portion 13c of the cable 13 and rotated clockwise together with the same inverted portion 13c.

The rotary body 11 is rotated both in the clockwise direction and the counterclockwise direction from its neutral position by the same amount.

An entire construction of the relative rotary members relaying apparatus 10 of the present invention has been described above. Next, a first embodiment of the present invention will be described in detail with reference to FIG. 2.

As shown in FIG. 2, the lower cover 12b is integrally formed on the fixed body 12. The upper cover 14b is fixedly mounted to the fixed body 12. A first radial clearance X1 is provided between the through hole 12c of the lower cover 12b and a bottom end portion 11d of the rotary body 11 and a second radial clearance X2 is provided between the through hole in the upper cover 14b and a top end portion 11e of the rotary body 11. The first radial clearance X1 is configured so as to be different from the second radial clearance X2. In this embodiment, the first radial clearance X1 is configured to be smaller than the second radial clearance X2.

In the relative rotary members relaying apparatus 10 having the above described structure, because the lower cover 12b and the upper cover 14b are fixedly mounted to the fixed body 12, the lower cover 12b and the upper cover 14b are rotated relative to the rotary body 11. That is, there is a possibility that sliding noises may occur in the first radial clearance X1 and the second radial clearance X2 by a relation between the through hole 12c in the lower cover 12b and the bottom end portion 11d of the rotary body 11 and a relation between the through hole 14c in the upper cover 14b and the top end portion 11e of the rotary body 11.

However, because the first radial clearance X1 is configured to be smaller than the second radial clearance X2, the through hole 14c of the upper cover 14b does not come into contact with the top end portion 11e of the rotary body 11 so that the sliding noise can be reduced correspondingly.

Next, a second embodiment of the present invention will be described with reference to FIG. 3. However, the same reference numerals are attached to the same parts as those of the first embodiment and a description thereof is simplified.

Figure 3:
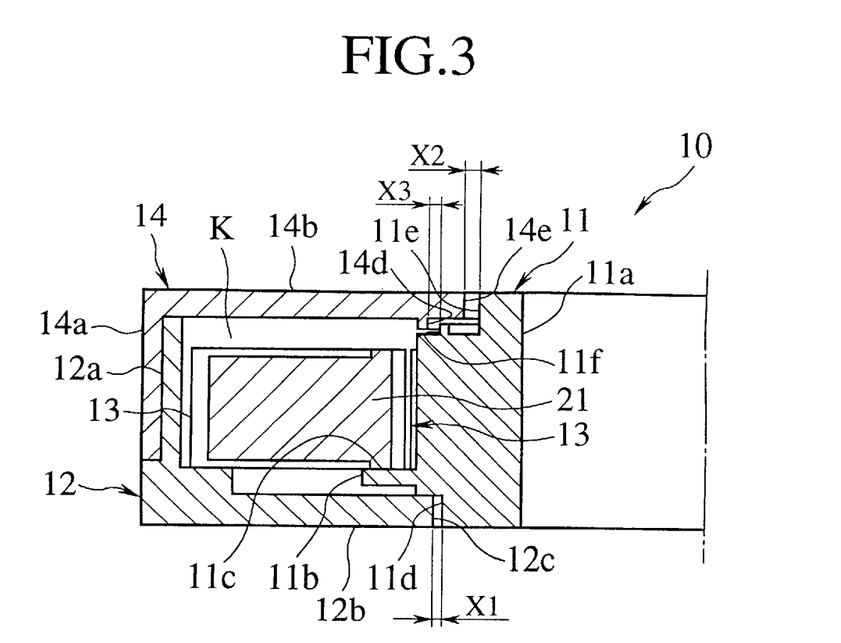
FIG. 3 is a partial sectional view of major parts of the relative rotary members relaying apparatus according to a second embodiment of the present invention.

As shown in FIG. 3, the internal cylindrical portion 11a is provided with an annular internal annular convex portion 11f protruding upward and the upper cover is provided with an external annular convex portion 14d which engages with the internal annular convex portion 11f. Then, a third radial clearance X3 is provided between the external annular convex portion 14d and the internal annular convex portion 11f. The third radial clearance X3 is also configured to be larger than the aforementioned first radial clearance X1. However, in this embodiment, the third radial clearance X3 is configured to be smaller than the second radial clearance X2. That is, the relationship is X1>X3>X2.

In the relative rotary members relaying apparatus 10 having the above described structure, because the first radial clearance X1 is configured to be the smallest, no contact occurs in the second radial clearance X2 and the third radial clearance X3. Correspondingly, the sliding nose can be reduced.

Although the third radial clearance X3 is configured to be smaller than the second radial clearance X2, it is permissible to configure the third radial clearance X3 to the same as the second radial clearance X2. That is, it is permissible to configure with a relationship of X1<X2=X3. In this case also, no sliding contact occurs in the second radial clearance X2 and the third radial clearance X3.

Figure 4:
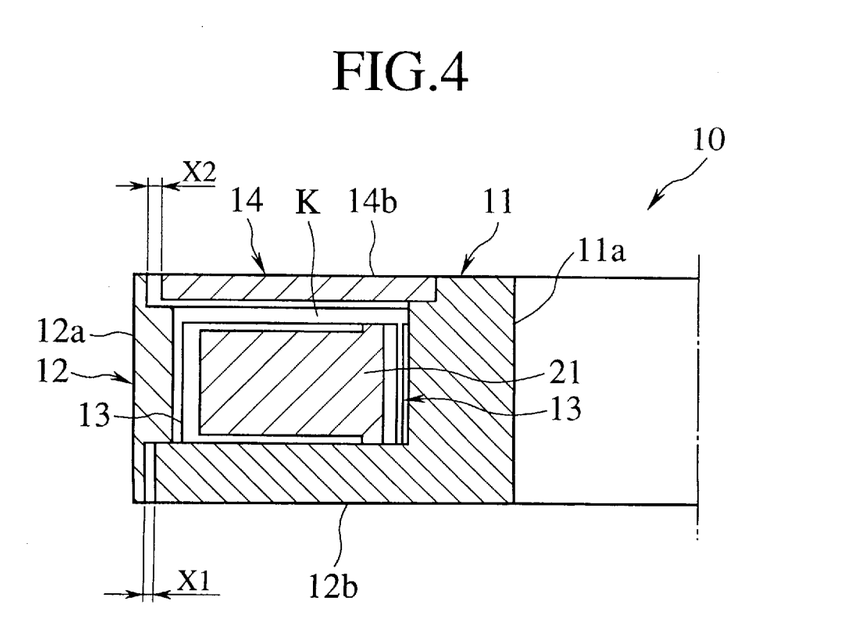
FIG. 4 is a partial sectional view of major parts of the relative rotary members relaying apparatus according to a third embodiment of the present invention.

Next, a third embodiment of the present invention will be described with reference to FIG. 4. The same reference numerals are attached to the same elements as those of the first embodiment, and a description thereof is simplified. Such a point in which the third embodiment is different from the first embodiment is that the lower cover 12b and the upper cover 14b are fixedly mounted to the rotary body 11.

That is, the lower cover 12b is integrally formed on the rotary body 11 and the upper cover 14b is fixedly mounted to the rotary body 11 through a connecting means (not shown). Then, a first radial clearance X1 is provided between the lower cover 12b and the external cylindrical portion 12a of the fixed body 12 and a second radial clearance is provided between the upper cover 14b and the external cylindrical portion 12a of the fixed body 12. The first radial clearance X1 is configured to be different from the second radial clearance X2 and in this embodiment, the first radial clearance X1 is configured to be smaller than the second radial clearance X2.

In the relative rotary members relaying apparatus 10 having the above described structure, because the lower cover 12b and the upper cover 14b are fixedly mounted to the rotary body 11, the lower cover 12b and the upper cover 14b are rotated relative to the fixed body 12. There is a possibility that sliding noise may occur in the first radial clearance X1 and the second radial clearance X2 by a relation between the lower cover 12b and the external cylindrical portion 12a and a relation between the upper cover 14b and the external cylindrical portion 12a.

However, because the first radial clearance X1 is configured to be smaller than the second radial clearance X2, the upper cover 14b is never in contact with the external cylindrical portion 12a and thus the sliding noise can be reduced correspondingly.

Figure 5:
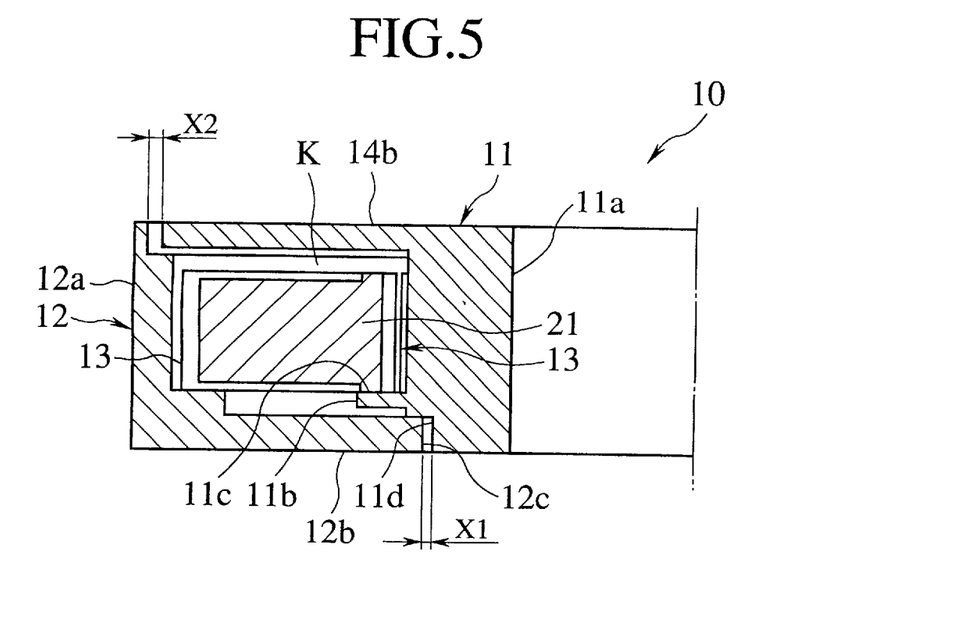
FIG. 5 is a partial sectional view of major parts of the relative rotary members relaying apparatus according to a fourth embodiment of the present invention.

Next, a fourth embodiment of the present invention will be described with reference to FIG. 5. The same reference numerals are attached to the same components as those of the first embodiment and a description thereof is simplified. Such a point in which this fourth embodiment is different from the first embodiment is that the upper cover 14b is formed integrally with the rotary body 11.

That is, the lower cover 12b is formed integrally with the fixed body 12 and the upper cover 14b is formed integrally with the rotary body 11. Then, a first radial clearance X1 is provided between the through hole 12c of the lower cover 12b and the bottom end portion 11d of the rotary body 11. A second radial clearance X2 is provided between the upper cover 14b and the external cylindrical portion 12a of the fixed body 12. The first radial clearance X1 is configured to be different from the second radial clearance X2 and in this embodiment, the first radial clearance X1 is configured to be smaller than the second radial clearance X2.

In the relative rotary members relaying apparatus having the above described structure, because the lower cover 12b is fixedly mounted to the fixed body 12 and the upper cover 14b is fixedly mounted to the rotary body 11, the lower cover 12b is rotated relative to the rotary body 11 and the upper cover 14b is rotated relative to the fixed body 12. That is, there is a possibility that a sliding noise may occur in the first radial clearance X1 by a relation between the through hole 12c in the lower cover 12b and the bottom end portion 11d of the rotary body 11 and that a sliding noise may also occur in the second radial clearance X2 between the upper cover 14b and the external cylindrical portion 12a.

However, because the first radial clearance X1 is configured to be smaller than the second radial clearance X2, the upper cover 14b is never in contact with the fixed body 12 and the sliding noise can be reduced correspondingly.

Figure 6:
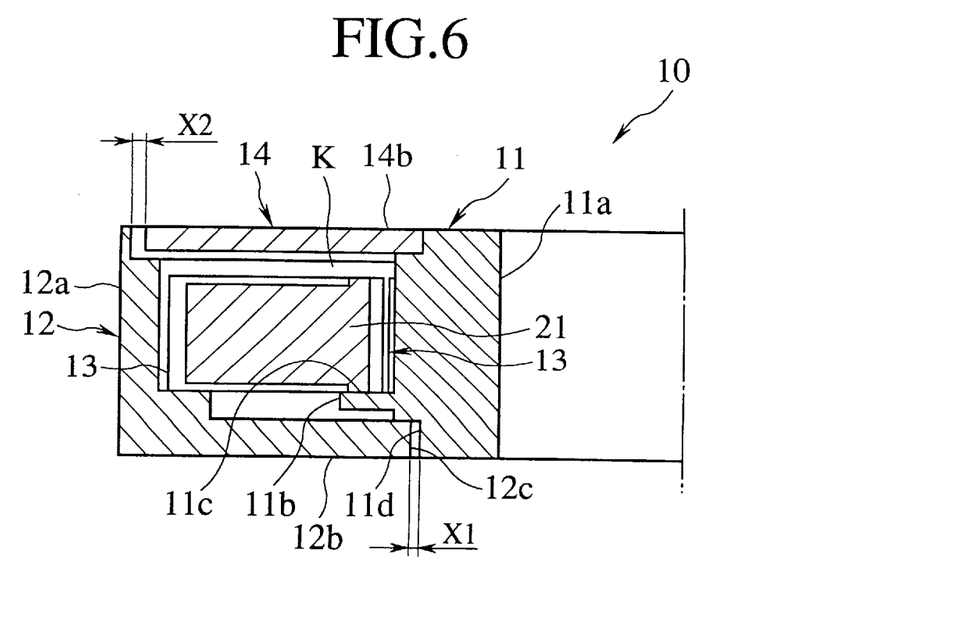
FIG. 6 is a partial sectional view of major parts of the relative rotary members relaying apparatus according to a fifth embodiment of the present invention.

Next, a fifth embodiment of the present invention will be described with reference to FIG. 6. The same reference numerals are attached to the same components as those of the fourth embodiment and a description thereof is simplified. Such a point in which the fifth embodiment is different from the fourth embodiment is that the upper cover 14b is fixedly mounted to the rotary body 11 trough a connecting means (not shown).

In the relative rotary members relaying apparatus 10 having the above described structure, because the upper cover 14b can be mounted to the rotary body 11 after the cable 13 and the moving body 21 are mounted in the space K, there is an advantage that the assembly is facilitated. In addition, the same operation and effect as in the fourth embodiment are provided.

Figure 7:
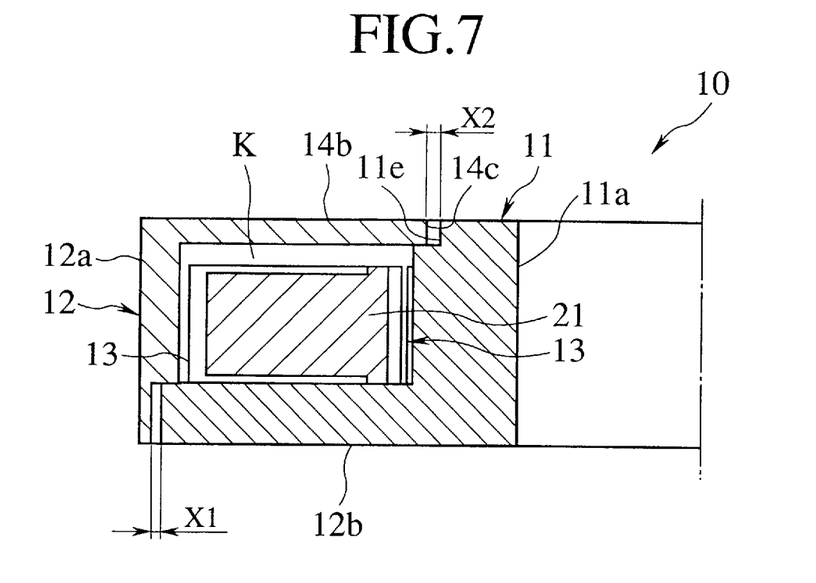
FIG. 7 is a partial sectional view of major parts of the relative rotary members relaying apparatus according to a sixth embodiment of the present invention.

Next, a sixth embodiment of the present invention will be described with reference to FIG. 7. The same reference numerals are attached to the same components as those of the first embodiment and a description thereof is simplified. Such a point in which the sixth embodiment is different from the first embodiment is that the lower cover 12b is formed integrally with the rotary body 11 and that the upper cover 14b is formed integrally with the fixed body 12.

That is, a first radial clearance X1 is provided between the lower cover 12b and the external cylindrical portion 12a of the fixed body 12. A second radial clearance X2 is provided between the through hole 14c of the upper cover 14b and the top end portion 11e of the rotary body 11. The first radial clearance X1 is configured to be different from the second radial clearance X2. In this embodiment, the first radial clearance X1 is configured to be smaller than the second radial clearance X2.

In the relative rotary members relaying apparatus 10 having the above described structure, the lower cover 12b is fixedly mounted to the rotary body 11 and the upper cover 14b is fixedly mounted to the fixed body 12. Thus, the lower cover 12b is rotated relative to the fixed body 12 and the upper cover 14b is rotated relative to the rotary body 11. That is, there is a possibility that a sliding noise may occur in the first radial clearance X1 by a relation between the lower cover 12b and the external cylindrical portion 12a of the fixed body 12 and that a sliding noise may occur in the second radial clearance X2 by a relation between the through hole 14c in the upper cover 14b and the top end portion 11e of the rotary body 11.

However, because the first radial clearance X1 is configured to be smaller than the second radial clearance X2, the through hole 14c in the upper cover 14b is never in contact with the top end portion 11e of the rotary body 11 and the sliding noise can be reduced correspondingly.

Figure 8:
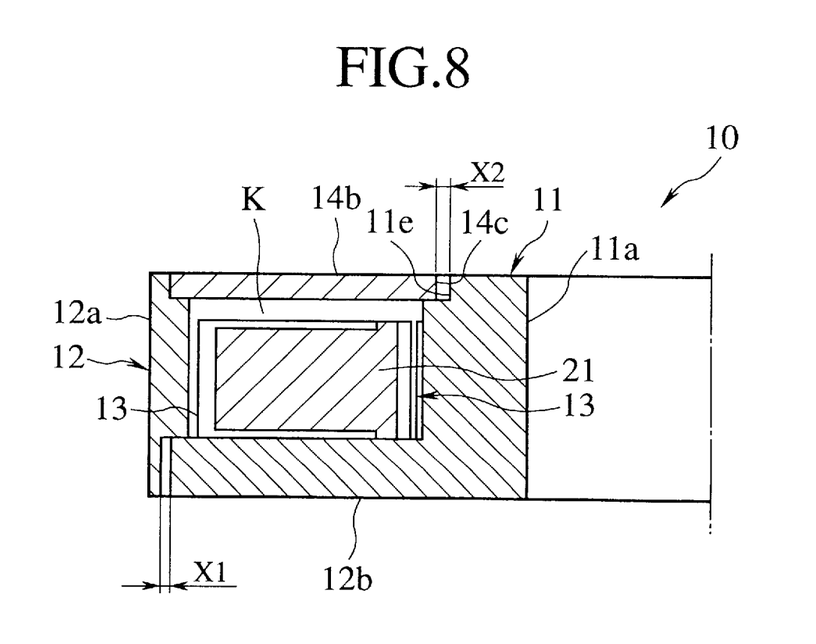
FIG. 8 is a partial sectional view of major parts of the relative rotary members relaying apparatus according to a seventh embodiment of the present invention.

Next, a seventh embodiment of the present invention will be described with reference to FIG. 8. The same reference numerals are attached to the same components as those of the sixth embodiment in FIG. 7 and a description thereof is simplified. Such a point in which the seventh embodiment is different from the sixth embodiment is that the upper cover 14b is fixedly mounted to the fixed body 12 through a connecting means (not shown).

In the relative rotary members relaying apparatus having the above described structure, because the upper cover 14b can be mounted to the fixed body 12 after the cable 13 and the moving body 21 are installed in the space K, there is an advantage that the assembly is facilitated. In addition, the same operation and effect as in the sixth embodiment are provided.

Although in the above respective embodiments, the first radial clearance X1 which is between the lower cover 12b and the rotary body 11 or between the lower cover 12b and the fixed body 12 is configured to be the smallest, it is permissible that the second radial clearance X2 is the smallest or the third radial clearance is the smallest. The lower cover 12b is constructed with rigid materials because it supports the rotary body 11 freely rotatably (see FIG. 2), the fixed body 12 (see FIG. 7) or the moving body 21. Thus, it is preferable to construct that sliding by the rotary member is burdened by the lower cover 12b by setting the first radial clearance X1 to be the smallest.

Although in the above respective embodiments, the moving body 21 is provided so as to allow the cable 13 to be inverted, it is permissible not to provide the moving body 21 but arrange the cable 13 in a spiral form.

Further, although the first rotary body is disposed as the rotary body 11 on the steering wheel side and the second rotary body is disposed as the fixed body 12 on the steering column side, it is permissible to so construct that the second rotary body is disposed as the fixed body 12 on the steering column side and that the second rotary body is disposed as the rotary body on the steering wheel side. Further, it is permissible that these members are mounted on a rotary member other than the steering section. Further, it is also permissible that they are disposed on a section in which both the rotary body and the fixed rotary body rotate.

Since it is apparent that different embodiments can be effected in a wide range without departing from the spirit and scope of the invention, the invention is not limited to the specific embodiment except for limitation made by the accompanying claims.

What is claimed is:

1. A relative rotary members relaying apparatus comprising:

a first rotary body having an internal cylindrical portion;

a second rotary body surrounding said internal cylindrical portion with a predetermined distance and having an external cylindrical portion relatively rotating to said internal cylindrical portion;

a flexible flat cable stored along an annular space provided between said internal cylindrical portion and said external cylindrical portion, an internal peripheral end portion thereof being held by said internal cylindrical portion and an external peripheral end portion thereof being held by said external cylindrical portion;

a moving body in the annular space between the stored flexible flat cable and the external cylindrical portion, the moving body comprising a C-shaped body having a gap, the external peripheral end of the flexible flat cable smoothly passes and turns through the gap, the moving body being movable along the annular space;

a first cover covering one side of said space in axial direction; and a second cover covering the other side of said space in axial direction, wherein said first cover and said second cover are fixedly mounted to said second rotary body, and a first clearance in a radial direction of the rotation of the first rotary body between said first cover and said first rotary body is configured to be different from a second clearance in the radial direction between said second cover and said first rotary body.

2. The relative rotary members relaying apparatus according to claim 1 further comprising:

an internal annular convex portion formed on said first rotary body; and an external annular convex portion formed on said second rotary body, wherein a third radial clearance between said internal annular convex portion and said external annular convex portion is configured to be larger than said first radial clearance and smaller than said second radial clearance.

3. The relative rotary members relaying apparatus according to claim 1 further comprising:

an internal annular convex portion formed on said first rotary body; and an external annular convex portion formed on said second rotary body, wherein a third radial clearance between said internal annular convex portion and said external annular convex portion is configured to be larger than said first radial clearance and equal to said second radial clearance.

4. A relative rotary members relaying apparatus comprising:

a first rotary body having an internal cylindrical portion;

a second rotary body surrounding said internal cylindrical portion with a predetermined distance and having an external cylindrical portion relatively rotating to said internal cylindrical portion;

a flexible flat cable stored along an annular space provided between said internal cylindrical portion and said external cylindrical portion, an internal peripheral end portion thereof being held by said internal cylindrical portion and an external peripheral end portion thereof being held by said external cylindrical portion;

a first cover covering one side of said space in axial direction; and a second cover covering the other side of said space in axial direction, wherein said first cover and said second cover are fixedly mounted to said first rotary body, and a first radial clearance between said first cover and said second rotating body is configured to be different from a second radial clearance between said second cover and said second rotary body.

5. A relative rotary members relaying apparatus comprising:

a first rotary body having an internal cylindrical portion;

a second rotary body surrounding said internal cylindrical portion with a predetermined distance and having an external cylindrical portion relatively rotating to said internal cylindrical portion;

a flexible flat cable stored along an annular space provided between said internal cylindrical portion and said external cylindrical portion, an internal peripheral end portion thereof being held by said internal cylindrical portion and an external peripheral end portion thereof being held by said external cylindrical portion;

a first cover covering the side of said space in axial direction; and a second cover covering the other side of said space in axial direction, wherein any one of said first cover and said second cover is fixedly mounted to said first rotary body and the other cover being fixedly mounted to said second rotary body, and a first radial clearance between said one cover and said second rotating body is configured to be different from a second radial clearance between said other cover and said first rotary body.

\* \* \* \* \*

UNITED STATES PATENT AND TRADEMARK OFFICE
CERTIFICATE OF CORRECTION

PATENT NO. : 5,871,367
DATED : February 16, 1999
INVENTOR(S) : ICHIKAWA et al.

It is certified that error appears in the above-identified patent and that said Letters Patent is hereby corrected as shown below:

Claim 5, column 10, line 25, "the side" should read --one side--.

Signed and Sealed this

Twenty-sixth Day of October, 1999

Attest:

Q. TODD DICKINSON

*Attesting Officer*            *Acting Commissioner of Patents and Trademarks*